(12) United States Patent
Ford

(10) Patent No.: US 6,905,114 B2
(45) Date of Patent: Jun. 14, 2005

(54) SHOCK ABSORBING AND SHOCK FORCE GENERATING APPARATUS WITH SHEAR PIN FOR AN OIL PUMP AND METHOD THEREFOR

(76) Inventor: Michael Brent Ford, 2716 Rio Vista, St. George, UT (US) 84790

( * ) Notice: Subject to any disclaimer, the term of this patent is extended or adjusted under 35 U.S.C. 154(b) by 3 days.

(21) Appl. No.: 10/630,158

(22) Filed: Jul. 30, 2003

(65) Prior Publication Data

US 2005/0023739 A1 Feb. 3, 2005

(51) Int. Cl.[7] ................................................ F16F 9/18
(52) U.S. Cl. ...................... 267/125; 175/321; 267/137; 188/371
(58) Field of Search ................................ 267/125, 137, 267/136; 188/371–377, 311, 317; 175/321; 403/2; 417/554, 552, 545, 53, 555.2, 430; 166/297–299, 166/380–381, 386, 105, 317, 334.4, 242.7

(56) References Cited

U.S. PATENT DOCUMENTS

| | | | | |
|---|---|---|---|---|
| 2,953,352 A | * | 9/1960 | Webb | .......................... 267/125 |
| 4,997,037 A | * | 3/1991 | Coston | ......................... 166/105 |
| 6,481,987 B2 | * | 11/2002 | Ford | .......................... 417/554 |

* cited by examiner

*Primary Examiner*—Douglas C. Butler
(74) *Attorney, Agent, or Firm*—Jeffrey Weiss; Harry M. Weiss; Weiss, Moy & Harris, P.C.

(57) ABSTRACT

A shock absorbing apparatus and method includes a shaft travelling north and south within a tube. The tube is positioned south of a sucker rod. The shaft has a piston head coupled at a south end thereof, which piston head is received in an area of reduced diameter with the shaft. North pores and south pores permit the movement of fluid into and out of the interior of the tube, in response to the northward/southward movement of the piston head. Fluid entering through the pores provides a shock absorbing effect on both the upstroke and the downstroke. The shock absorbing effect on the upstroke can be rapidly eliminated and an upward shock force generated, through the shearing of a shear pin that maintains a bushing in position on the shaft, restricting northward travel of the piston head.

9 Claims, 1 Drawing Sheet

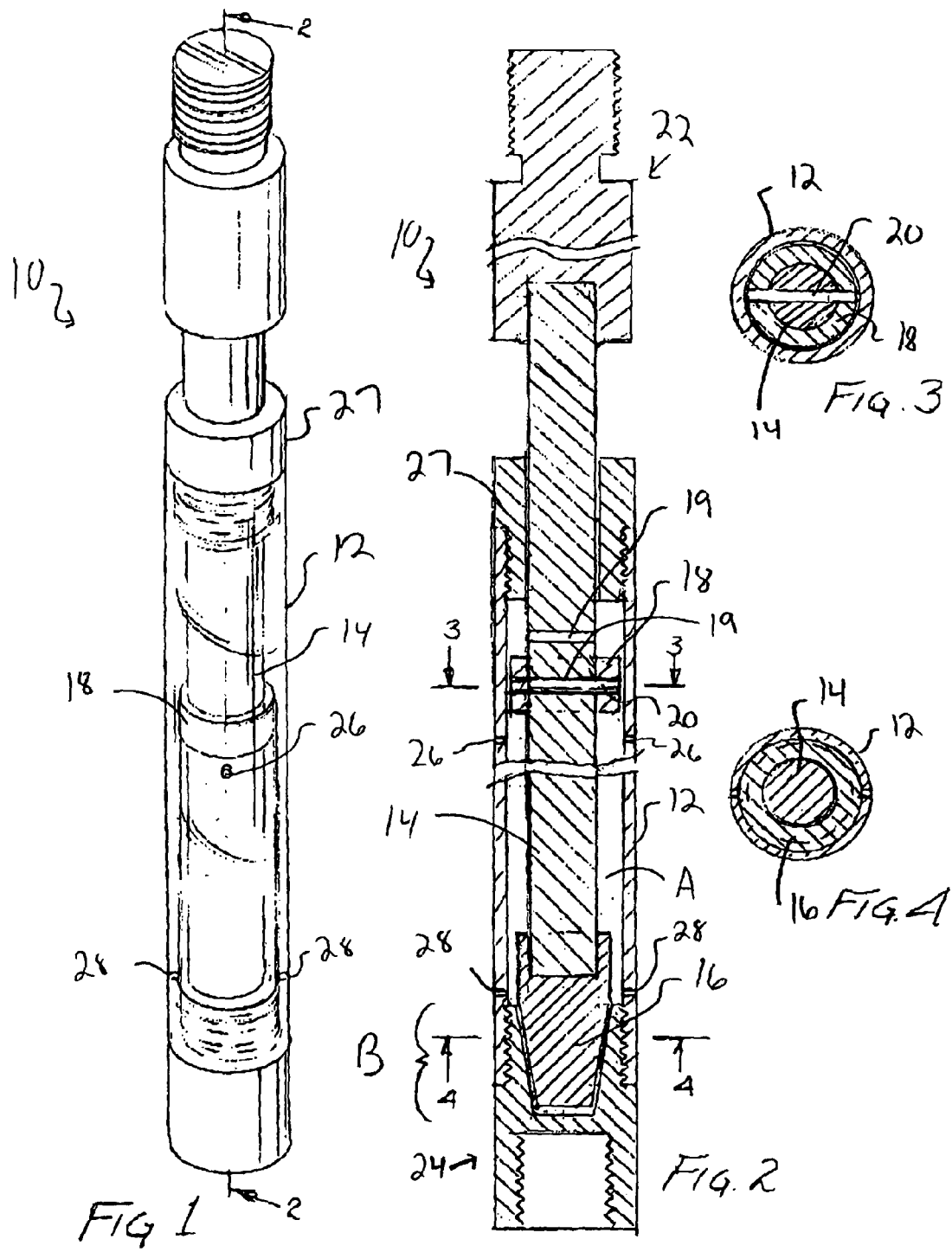

SHOCK ABSORBING AND SHOCK FORCE GENERATING APPARATUS WITH SHEAR PIN FOR AN OIL PUMP AND METHOD THEREFOR

BACKGROUND OF THE INVENTION

1. Field of Invention

This invention relates generally to oil well pumping systems and, more specifically, to a shock absorbing and shock force generating apparatus and method that is intended to reduce stress on the sucker rod and/or other pump components.

2. Background of the Invention

In general terms, an oil well pumping system begins with an above-ground pumping unit, which creates the up and down pumping action that moves the oil (or other substance being pumped) out of the ground and into a flow line, from which the oil is taken to a storage tank or other such structure.

Below ground, a shaft is lined with piping known as "tubing." Into the tubing is inserted a sucker rod, which is ultimately, indirectly, coupled at its north end to the above-ground pumping unit. Below the sucker rod are located a number of pumping system components, including a standing valve, travelling valve, plunger, and other oil pump components. The sucker rod is typically coupled at its south end to a bushing, which is located north of the valves and plunger.

Oil (or other fluid) is pumped from a hole through a series of "downstrokes" and "upstrokes" of the oil pump, which motion is imparted by the above-ground pumping unit and communicated via the sucker rod. During the upstroke, formation pressure causes a ball located in the standing valve to move upward, allowing the oil to pass through the standing valve and into the barrel of the oil pump. This oil will be held in place between the standing valve and the travelling valve.

On the downstroke, the ball in the travelling valve is lifted off of its seat, to a positive open position, permitting the oil that has passed through the standing valve to pass therethrough. Also during the downstroke, the ball in the standing valve seats, preventing the pumped oil from moving back down into the hole. The force of the up and down motion causes stress on the sucker rod, and over time creates the need to replace this component. A need exists for an apparatus and method that reduces stress on the sucker rod, by creating a shock absorber effect during up and down movement of the pump.

In addition, it is sometimes the case that the pumping system, south of the sucker rod, can become stuck during operation. Typically, this occurs at the mandrel. In such event, it is necessary to remove the stuck portion from the well, so that it may be replaced or repaired. However, it can be difficult to generate the force needed for such removal, and this pulling action can also cause damaging stress to the sucker rod and/or other pump components. Accordingly, a need exists for an apparatus and method that will permit pump removal with less pulling force.

The present invention addresses these needs and provides other, related, advantages.

SUMMARY OF THE INVENTION

It is an object of the present invention to provide an apparatus and method that will act as a shock absorber during north and south movement of a sucker rod, reducing stress on the sucker rod.

It is a further object of the present invention to provide an apparatus and method that will facilitate the generation of upward shock force, so as to permit the removal of pump components with reduced pulling force.

BRIEF DESCRIPTION OF THE DRAWINGS

FIG. 1 is a perspective of a shock absorbing and shock force generating apparatus consistent with an embodiment of the present invention.

FIG. 2 is a side, cross-sectional view of the apparatus of FIG. 1, taken along line 2—2.

FIG. 3 is a top, cross-sectional view of the apparatus of FIG. 2, taken along line 3—3.

FIG. 4 is a top, cross-sectional view of the apparatus of FIG. 2, taken along line 4—4.

DETAILED DESCRIPTION OF THE PREFERRED EMBODIMENTS

Referring to FIGS. 1–4, an embodiment of the shock absorbing and shock force generating apparatus 10 (hereinafter "apparatus 10") of the present invention is shown. In describing the structure of the apparatus 10 and its operation, the terms "north" and "south" are utilized. The term "north" is intended to refer to that end of the pumping system that is more proximate the pumping unit, while the term "south" refers to that end of the system that is more distal the pumping unit, or "downhole."

Beginning from the north end (the top in the drawing figures), the main exterior topography of this embodiment of the apparatus 10, which has a substantially cylindrical external configuration, includes the following: (a) a tube 12; (b) a shaft 14 positioned with the tube 12; (c) a piston head 16 positioned at the south end of the shaft 14; (d) a bushing 18 coupled about the shaft 14 with a shear pin 20 that extends through one of a plurality of openings 19 in the shaft 14 and that is attached at each end thereof to the bushing 18; (e) a north coupling region 22; and (f) a south coupling region 24.

Now treating certain of the components of the apparatus 10 in greater detail, it is noted that the interior of the tube 12 has a first, north region A and a second, south region B, wherein the north region A has a greater diameter than at least a portion of the south region B. In particular, as shown in FIG. 2, it is preferred that the south region B be substantially funnel-shaped, so as to progress southward from an area of greater diameter to an area of reduced diameter. It is further desired that the piston head 16 have an external configuration that is substantially bullet-shaped, and that substantially mates with (though without physically contacting) the interior of region B. It is further desired that the piston head 16 be spiralled, so as to impart rotation during up and down movement of the shaft 14 within the tube 12.

Referring now to FIGS. 1 and 2, it is desired to provide a set of north pores 26 through said tube 12, and a set of south pores 28 through said tube 12. The positioning of the north and south pores 26 and 28 should be such that, during normal pumping operation as described more fully below, the piston head 16 will pass north of the south pores 28, but will remain south of the north pores 26. In this manner, and again during normal operation, fluid will be present, at various times both north and south of the piston head 16 within the tube 12.

The apparatus 10 is intended to be positioned south of the sucker rod. Preferably, the apparatus 10 is coupled north of the bushing, which in turn is north of the valve rod in a typical pumping unit. The north coupling region 22 may be coupled, as desired and by way of example only, to the sucker rod, valve rod bushing, or sucker rod string. The south coupling region 24 may be coupled, as desired and by way of example only, to the bushing. (Of course, it may be desired to make the north coupling region 22 female, and/or to make the south coupling region 24 male, for particular coupling configurations.)

STATEMENT OF OPERATION

On the downstroke, the piston head 16 will travel southward, from region A within tube 12 toward region B. A portion of the fluid that is located south of piston head 16 and within tube 12 will be pushed out of the interior of tube 12, through south pores 28. The presence of fluid below the piston head 16 creates a shock absorber effect, cushioning the downward force of the downstroke. (It should be noted that the amount of such shock absorbing effect can be varied, as desired, by varying the number, location and/or diameter of the south pores 28.) Also during the downstroke, fluid is drawn into the interior of tube 12, via north pores 26.

On the upstroke, the process reverses itself. Fluid is drawn in through the south pores 28, and a portion of the fluid that is north of the piston head 16 is squeezed out through north pores 26. The presence of fluid above the piston head 16 also creates a shock absorber effect, cushioning the upward force of the upstroke. Also during the upstroke, fluid is drawn in through south pores 28.

The amount of travel of the piston head 16 is regulated by the positioning of the bushing 18, which contacts an end cap 27 that defines the north end of the interior of tube 12. Positioning of the bushing 18 is determined by placement of the shear pin 20 in a desired opening 19. Generally, the more southerly the position of the bushing 18 relative to the shaft 14, the greater the shock absorbing effect that is created. (It should be noted that while two openings 19 are shown in FIG. 2, it would be possible to provide a greater number of openings 19 so as to impart still further variability with respect to shock absorber effect—or, indeed, to provide only a single opening 19.)

The bushing 18 is positioned so as to prevent the piston head 16, during normal pumping operations, from passing sufficiently north of north pores 26, so as to permit fluid to escape below the piston head 16 and through north pores 26.

In the event that the pump has become stuck and it is desired to remove it from the well, upward pulling force will be applied to the shaft 14. At a predetermined stress level, shear pin 20 will shear. This allows piston head 16 to travel farther northward, passing north pores 26. This eliminates shock absorbance at the north end of tube 12, and results in an upward shock force or jackhammer effect. In most cases, this should be sufficient to unseat the pump, permitting its removal from the well. Of course, prior to re-inserting the apparatus 10, it will be desired to replace shear pin 20.

It should be further noted that when the piston head 16 passes the south pores 28, it seals them, trapping fluid in region B. This creates a liquid bearing, allowing shaft 14 to turn with no resistance. According, if shaft 14 becomes stuck, it can be turned, thereby unscrewing end cap 27 from tube 12, permitting the removal of the shaft 14 without breakage.

While the invention has been particularly shown and described with reference to preferred embodiments thereof, it will be understood by those skilled in the art that the foregoing and other changes in form and details may be made therein without departing from the spirit and scope of the invention.

For example, in the event that it is desired to provide only a shock absorber effect, and not also to provide an upward shock force effect, it may be possible to eliminate the shear pin 18 and bushing 20, and to provide other means to regulate the amount of northward travel of the piston head 16.

I claim:

1. A shock absorbing apparatus for use in a pumping apparatus comprising, in combination:
   a tube having a north interior region and a south interior region and adapted to be coupled within a pumping system south of a sucker rod;
   wherein said north interior region has a greater diameter than at least a portion of said south interior region;
   north pores located in said tube and permitting a flow of fluid into and out of an interior of said tube;
   south pores located in said tube and permitting a flow of fluid into and out of said interior of said tube;
   a shaft located within said tube and capable of north and south movements relative to said tube;
   a piston head coupled proximate a south end of said shaft;
   wherein said piston head is adapted to enter said south interior region;
   wherein said piston head is adapted to travel north of said south pores so as to permit fluid to alternately enter and exit through said south pores during pumping operations; and
   a bushing coupled to said shaft north of said piston head;
   wherein said bushing is coupled to said shaft via a shear pin that passes through a shear pin opening in said shaft and wherein said shear pin is coupled at ends thereof to said bushing.

2. The shock absorbing apparatus of claim 1 further comprising at least two shear pin openings in said shaft.

3. The shock absorbing apparatus of claim 1 wherein said shear pin is adapted to shear at a pre-selected stress level.

4. A shock absorbing apparatus for use in a pumping apparatus comprising, in combination:
   a tube having a north interior region and a south interior region and adapted to be coupled within a pumping system south of a sucker rod;
   wherein said north interior region has a greater diameter than at least a portion of said south interior region;
   wherein said south interior region has a substantially funnel-shape;
   north pores located in said tube and permitting a flow of fluid into and out of an interior of said tube;
   south pores located in said tube and permitting a flow of fluid into and out of said interior of said tube;
   a shaft located within said tube and capable of north and south movements relative to said tube;
   a piston head coupled proximate a south end of said shaft;
   wherein said piston head is adapted to enter said south interior region;
   wherein said piston head has a substantially bullet-shaped exterior configuration;

wherein said piston head is adapted to travel north of said south pores so as to permit fluid to alternately enter and exit through said south pores during pumping operations; and a bushing coupled to said shaft north of said piston head;

wherein said bushing is coupled to said shaft via a shear pin that passes through a shear pin opening in said shaft and wherein said shear pin is coupled at ends thereof to said bushing; and wherein said shear pin is adapted to shear at a pre-selected stress level.

5. The shock absorbing apparatus of claim 4 further comprising at least two shear pin openings in said shaft.

6. A method for absorbing shock during pumping operations comprising the steps of:

providing a tube having a north interior region and a south interior region and adapted to be coupled within a pumping system south of a sucker rod;

wherein said north interior region has a greater diameter than at least a portion of said south interior region;

providing north pores located in said tube and permitting a flow of fluid into and out of an interior of said tube;

providing south pores located in said tube and permitting a flow of fluid into and out of an interior of said tube;

providing a shaft located within said tube and capable of north and south movements relative to said tube;

providing a piston head coupled proximate a south end of said shaft;

wherein said piston head is adapted to enter said south interior region;

wherein said piston head is adapted to travel north of said south pores so as to permit fluid to alternately enter and exit through said south pores during pumping operations;

providing a bushing coupled to said shaft north of said piston head;

wherein said bushing is coupled to said shaft via a shear pin that passes through a shear pin opening in said shaft and wherein said shear pin is coupled at ends thereof to said bushing;

causing said shaft and said piston head to move in a north direction relative to said tube;

during said movement in said north direction, drawing fluid into an interior of said tube via said south pores;

during said movement in said north direction, pushing fluid out of an interior of said tube via said north pores;

causing said shaft and said piston head to move in a south direction relative to said tube;

during said movement in said south direction, drawing fluid into an interior of said tube via said north pores; and during said movement in said south direction, pushing fluid out of an interior of said tube via said south pores.

7. The shock absorbing apparatus of claim 6 further comprising at least two shear pin openings in said shaft.

8. The method of claim 6 wherein said shear pin is adapted to shear at a pre-selected stress level.

9. The method of claim 8 further comprising the steps of:

pulling said shaft in a north direction so as to impart stress at at least said pre-selected stress level on said shear pin;

said shear pin failing; and said piston head travelling in a north direction relative to said tube so that at least a portion of said piston head passes said north pores, permitting fluid to exit an interior of said tube therethrough and thereby causing an upward shock force.

* * * * *